(12) United States Patent
Mitchell et al.

(10) Patent No.: US 7,430,914 B2
(45) Date of Patent: Oct. 7, 2008

(54) VIBRATION ANALYZING DEVICE

(75) Inventors: David Hamilton Mitchell, Glasgow (GB); Ian Alexander Hutchison, Glasgow (GB)

(73) Assignee: Mitsui Babcock (US) LLC, Atlanta, GA (US)

( * ) Notice: Subject to any disclaimer, the term of this patent is extended or adjusted under 35 U.S.C. 154(b) by 384 days.

(21) Appl. No.: 11/229,061

(22) Filed: Sep. 16, 2005

(65) Prior Publication Data

US 2007/0062291 A1    Mar. 22, 2007

(51) Int. Cl.
*G01N 29/024*    (2006.01)
(52) U.S. Cl. .................. 73/649; 579/597; 579/599; 579/602
(58) Field of Classification Search .......... 73/649, 73/579, 587, 599, 600, 602, 646, 597
See application file for complete search history.

(56) References Cited

U.S. PATENT DOCUMENTS 4,302,977 A * 12/1981 Sisson et al. .................. 73/658
5,448,911 A * 9/1995 Mason ..................... 73/152.47
5,934,610 A * 8/1999 Karolys et al. ............ 244/53 R
6,289,735 B1 * 9/2001 Dister et al. .................. 73/579
6,463,813 B1 * 10/2002 Gysling .................... 73/862.59
6,763,310 B2 * 7/2004 Lafleur et al. .................. 702/33
6,843,126 B2 * 1/2005 Hulsing, II ............... 73/504.04
7,107,839 B1 * 9/2006 Berman et al. ................. 73/489

* cited by examiner

*Primary Examiner*—Hezron E. Williams
*Assistant Examiner*—Jacques M. Saint-Surin

(57) ABSTRACT

A vibration analysing device for determining the vibrational response of a structural element, comprising: a vibration sensor for providing an output in response to a force input imparted to the structural element; processing means adapted to determine one of a plurality of classifications in response to the output, each classification corresponding to a condition of the structural element; and display means for displaying the determined classification.

16 Claims, 6 Drawing Sheets

VIBRATION ANALYZING DEVICE

The present invention relates to the analysis of vibrations. In particular, but not exclusively, the invention relates to the analysis of structural vibrations in pipe-work.

In many industrial facilities, there may be many hundreds of meters of pipe-work for conveying fluids. Each section of pipe-work will require periodic checking. For instance, the pipe may be conveying an explosive or toxic fluid, possibly at high pressure, and so the consequences of pipe failure may be great. For pipe-work, the most common failure modes associated with vibration are that of fatigue, loosening and fretting failure.

Vibration testing and analysis, and in particular the interpretation of vibration test data, is complex and conventionally requires a high level of skill and knowledge. Such a level is beyond that of typical operation staff within the facility. It is often therefore necessary to engage the services of highly skilled personnel for checking pipe-work.

There are many different methods employed in the interpretation of vibration test data and no formal standard exists on the matter. However, a number of predetermined vibration criteria are known, such as those developed by Walter Von Nimitz, J C Wachel, C L Bates and South West Research Institute which have become an industry standard.

It is common to determine a number of response frequencies for a structural element such as a pipe and the amplitude of the structural element's response at each of these frequencies. Typically, the amplitude at each response frequency is compared with the set of predetermined vibration criteria using a superimposition method.

If the vibration energy is concentrated more at the dominant frequency of the structural element then this approach could significantly underestimate the vibration response of the structure. In such a case, it may be concluded that the structural element under the existing loading conditions will not fail when there is a possibility that it will fail.

According to a first aspect of the present invention, there is provided a vibration analyzing device for determining the vibration response of a structural element, comprising:

a vibration sensor for providing an output in response to a force input imparted to the structural element;

processing means adapted to determine one of a plurality of classifications in response to the output, each classification corresponding to a condition of the structural element; and display means for displaying the determined classification.

Preferably each of the plurality of classifications corresponds to a different probability of failure of the structural element. Preferably the plurality of different probabilities of failure correspond to different predetermined vibration criteria.

Preferably the force input comprises the actual loading conditions of the structural element.

Preferably the structural element comprises a conduit, such as a pipe. Preferably the force input comprises one or more sources of excitation including, but not limited to, the flow, pulsation and transmission. Alternatively, the structural element may comprise a part of the body, such as the hand or arm, of a human operator.

Preferably the vibration sensor comprises an accelerometer and the output comprises acceleration data. Preferably the vibration sensor is a tri-axial sensor for providing an output for each of three orthogonal axes. Preferably the processing means is adapted to process the output for each of the three orthogonal axes.

Preferably the device includes a Fast Fourier Transform (FFT) analyzer. Preferably the FFT analyzer is adapted to provide frequency response data corresponding to the output of the vibration sensor.

Preferably the device includes a high pass filter. Preferably the high pass filter is adapted to filter out frequencies below 2 Hz. Preferably the device includes a low pass filter. Preferably the low pass filter is adapted to filter out frequencies above 2000 Hz.

Preferably the processing means is provided by a computer. Preferably the computer comprises a portable computer such as a pocket PC, palm top PC or lap top PC. Preferably the device includes hardware, such as an interface card, for connecting the vibration sensor and the computer. Preferably software is provided for programming the computer to determine the vibration response of the structure. Preferably the display means comprises the display of the computer.

Preferably the device includes transmitting means for transmitting vibration data to a third party. Preferably the data comprises one or more of the output from the vibration sensor, the frequency response from the FFT analyzer and the classification.

According to a second aspect of the present invention, there is provided a method of determining the vibration response of a structural element, comprising the steps of:

sensing an output of the structural element in response to a force input imparted to the structural element;

determining one of a plurality of classifications in response to the output, each classification corresponding to a condition of the structural element; and displaying the determined classification.

Preferably each of the plurality of classifications corresponds to a different probability of failure of the structural element. Preferably the plurality of different probabilities of failure correspond to different predetermined vibration criteria.

Preferably the method includes color coding each of the classifications.

Preferably the method includes using the actual loading conditions of the structural element as the force input.

Preferably the structural element comprises a conduit, such as a pipe. Alternatively, the structural element may comprise a part of the body, such as the hand or arm, of a human operator.

Preferably the step of sensing an output of the structural element comprising sensing an acceleration of the structural element.

Preferably the method includes determining frequency response data for the structural element from the sensed output of the structural element. Preferably the method includes determining a peak frequency for the structural element.

Preferably the method includes filtering the output. Preferably the output is filtered in the range of 2 to 2000 Hz.

Preferably the method includes integrating one of the acceleration data and the frequency response data determined from the acceleration data to determine velocity data for the structural element. Preferably the method includes determining a single Root Mean Square (RMS) amplitude value from the velocity data.

Preferably the method includes associating the single RMS amplitude value with the peak frequency.

Preferably the method includes providing at least one predetermined vibration criterion. Preferably the or each criterion comprises a plurality of amplitude values, each value having an associated frequency value.

Preferably the method includes comparing the single RMS amplitude value with the amplitude value of the vibration criterion which is associated with the peak frequency to determine the classification.

Preferably the method includes transmitting vibration data to a third party. Preferably the data comprises one or more of the output, the frequency response data, the RMS value, the peak frequency and the classification.

According to a third aspect of the present invention, there is provided a method of determining the vibration response of a structural element, comprising the steps of:
- sensing an output of the structural element in response to a force input imparted to the structural element;
- calculating frequency response data for the structural element from the sensed output of the structural element;
- determining a single amplitude value from the frequency response data;
- determining a peak frequency from the frequency response data;
- associating the single amplitude value with the peak frequency;
- providing at least one predetermined vibration criterion, the or each criterion comprising a plurality of amplitude values, each amplitude value having an associated frequency value; and
- comparing the single amplitude value with the amplitude value of the or each criterion associated with the peak frequency.

Preferably the step of sensing an output of the structural element comprises sensing an acceleration of the structural element to provide acceleration data.

Preferably the method includes integrating one of the acceleration data and the frequency response data determined from the acceleration data to determine velocity data for the structural element.

Preferably the single amplitude value is a velocity value. Preferably the single amplitude value is a Root Mean Square (RMS) value of the velocity data.

Preferably the method includes determining one of a plurality of classifications in response to the comparison, each classification corresponding to a condition of the structural element.

Preferably each of the plurality of classifications corresponds to a different probability of failure of the structural element. Preferably the plurality of different probabilities of failure correspond to different predetermined vibration criteria.

Preferably the method includes presenting the classification to the user. Preferably the method includes color coding each of the classifications.

Preferably the method includes transmitting vibration data to a third party.

Preferably the data comprises one or more of the output, the frequency response, the single value, the peak frequency and the classification.

An embodiment of the present invention will now be described, by way of example only, with reference to the accompanying drawings, in which.

Figure 1:
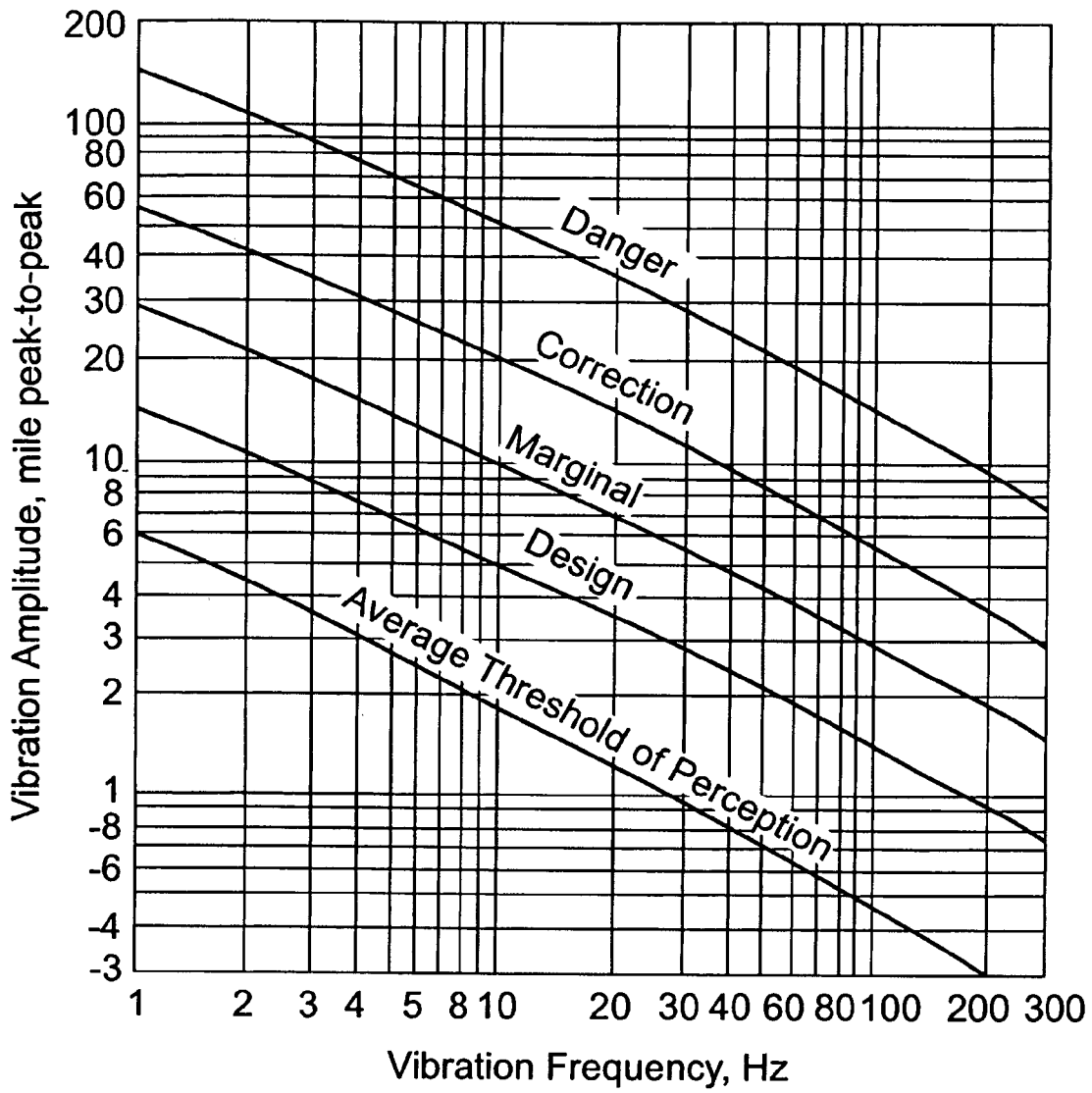
FIG. 1 is a graph of known predetermined vibration criteria using displacement with respect to frequency.

FIG. 1 shows a number of known predetermined vibration criteria for structural elements such as pipes. These criteria, developed by Walter Von Nimitz, J C Wachel, C L Bates and South West Research Institute (SWRI), use displacement with respect to frequency. While the criteria tend to be conservative for long flexible piping spans, they have become the industry standard for pipe applications.

Figure 2:
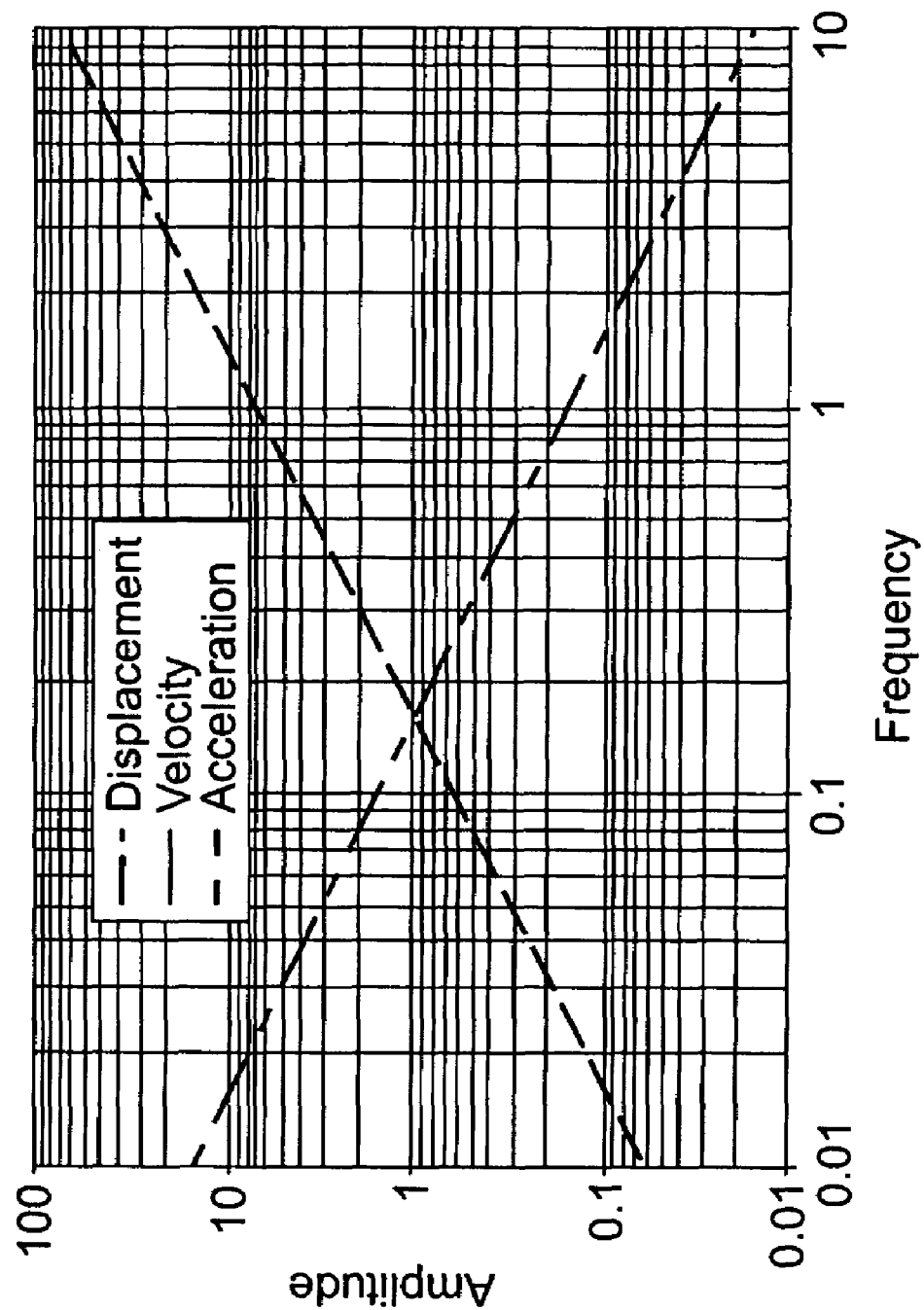
FIG. 2 is a graph showing the relationship between displacement, velocity and acceleration.

Piping vibration can be defined in terms of acceleration, velocity or displacement. The amplitude for all these parameters is dependent on frequency and their relationship is shown in FIG. 2. Acceleration is weighted such that the highest amplitude occurs at the highest frequency. Conversely, displacement is frequency dependent in a manner which results in a large displacement at low frequencies and small displacements at high frequencies for the same amount of energy. Velocity results in a more uniform weighting over the frequency range and is more directly related to the resulting dynamic stress. Therefore, using velocity is advantageous for the measurement of vibration in pipes.

Figure 3:
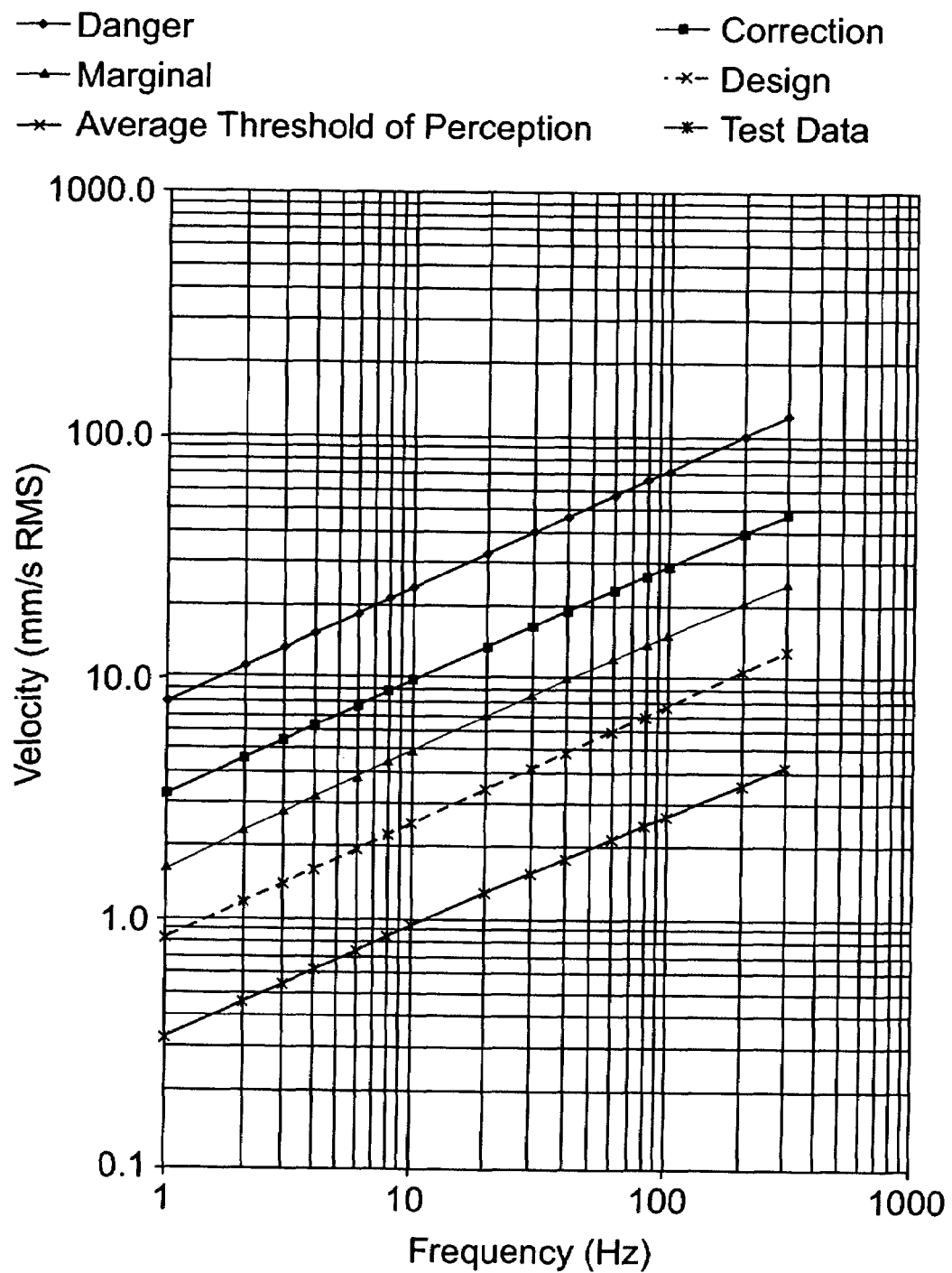
FIG. 3 is a graph of predetermined vibration criteria using velocity with respect to frequency.

FIG. 3 shows predetermined vibration criteria developed by the Applicant. The known criteria have been converted from peak-to-peak displacement to velocity RMS. The curves are also for constant amplitude loading, and under narrow band random loading the RMS to peak-to-peak ratio changes from approximately 3 to a factor of approximately 6. This means that, for the same RMS value, higher peak-to-peak stresses would occur under the latter type loading compared to steady state loading.

The conventional approach when using vibration criteria is to determine the amplitude at each peak frequency and plot these points on the graph. However, it has been found that such an approach can underestimate the true vibration response of the structure. For example, a pipe may respond at two peak frequencies, 10 and 20 Hz, and have rms vibration velocities of 9.7 mm/sec rms at 10 Hz and 13.4 mm/sec rms at 20 Hz. These points are shown in FIG. 3. Using a superimposing method, the points would appear on the criteria curves at the two locations detailed "Superimposed" in FIG. 3. That is, they would both be at the top of the marginal band and classified as 'marginal'.

The Applicant's inventive approach is to calculate a single overall RMS value over the entire frequency range which is considered to act at the lowest dominant frequency. This point is compared to the vibration criteria to determine the classification.

Figure 4:
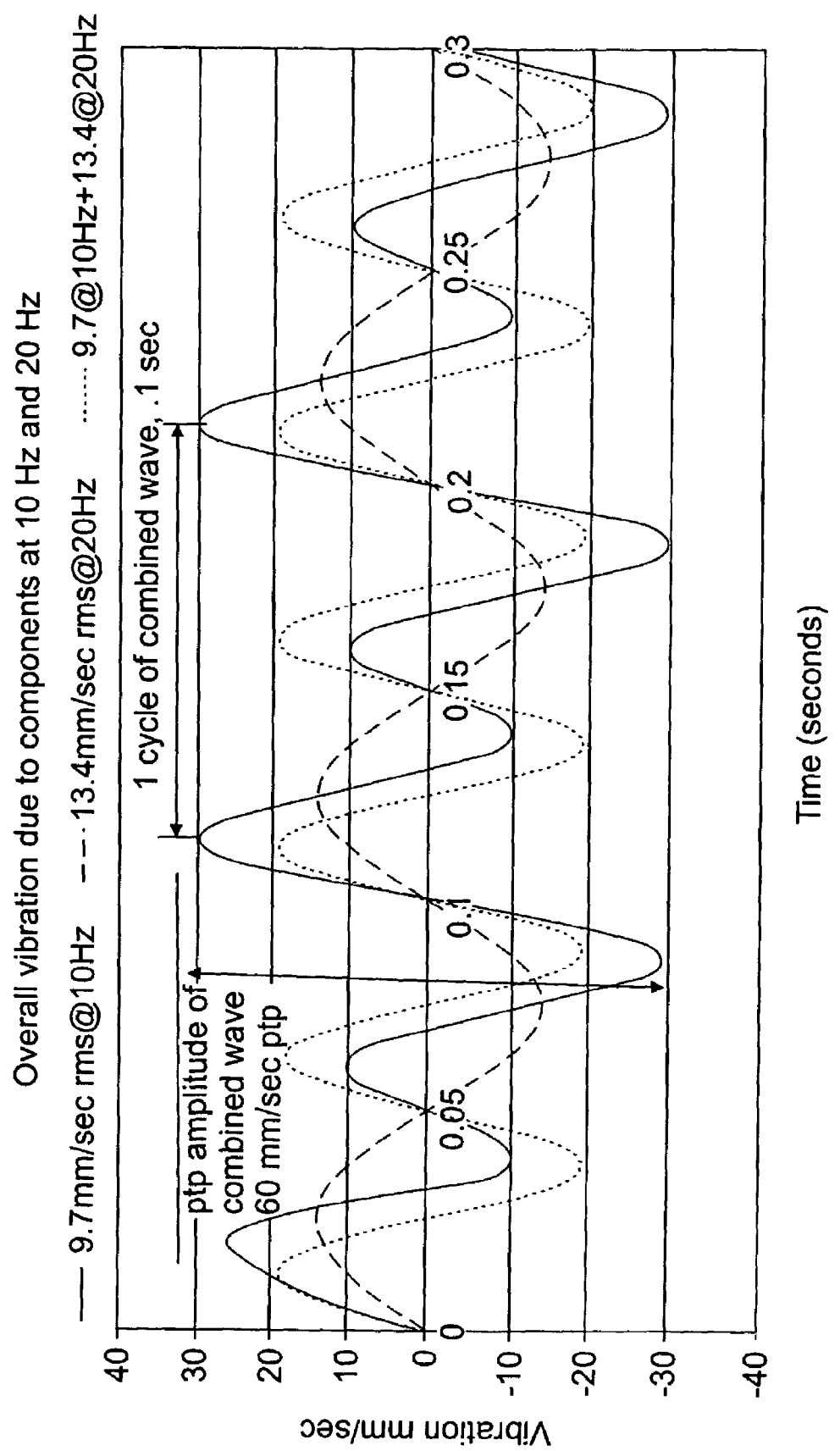
FIG. 4 is a graph of the vibration at two modes of a structural element with respect to time.

The combination of the two frequencies in the time domain, along with their individual responses, is detailed in FIG. 4. Examination of the combined curve indicates a peak-to-peak velocity of 65 mm/sec at 10 Hz, the frequency of the lower response. Converted to rms values this is 23 mm/sec rms at 10 Hz. This value is considerably closer to the true value (labeled "actual" in FIG. 3) and is in fact within the 'danger' band, well above the "Superimposed" points.

Therefore, the Applicant's method results in a more accurate result. Furthermore, it is more applicable for failure modes such as fatigue or fretting since these modes are strongly influenced by the amplitude of the vibrations of the structural element.

Figure 5:
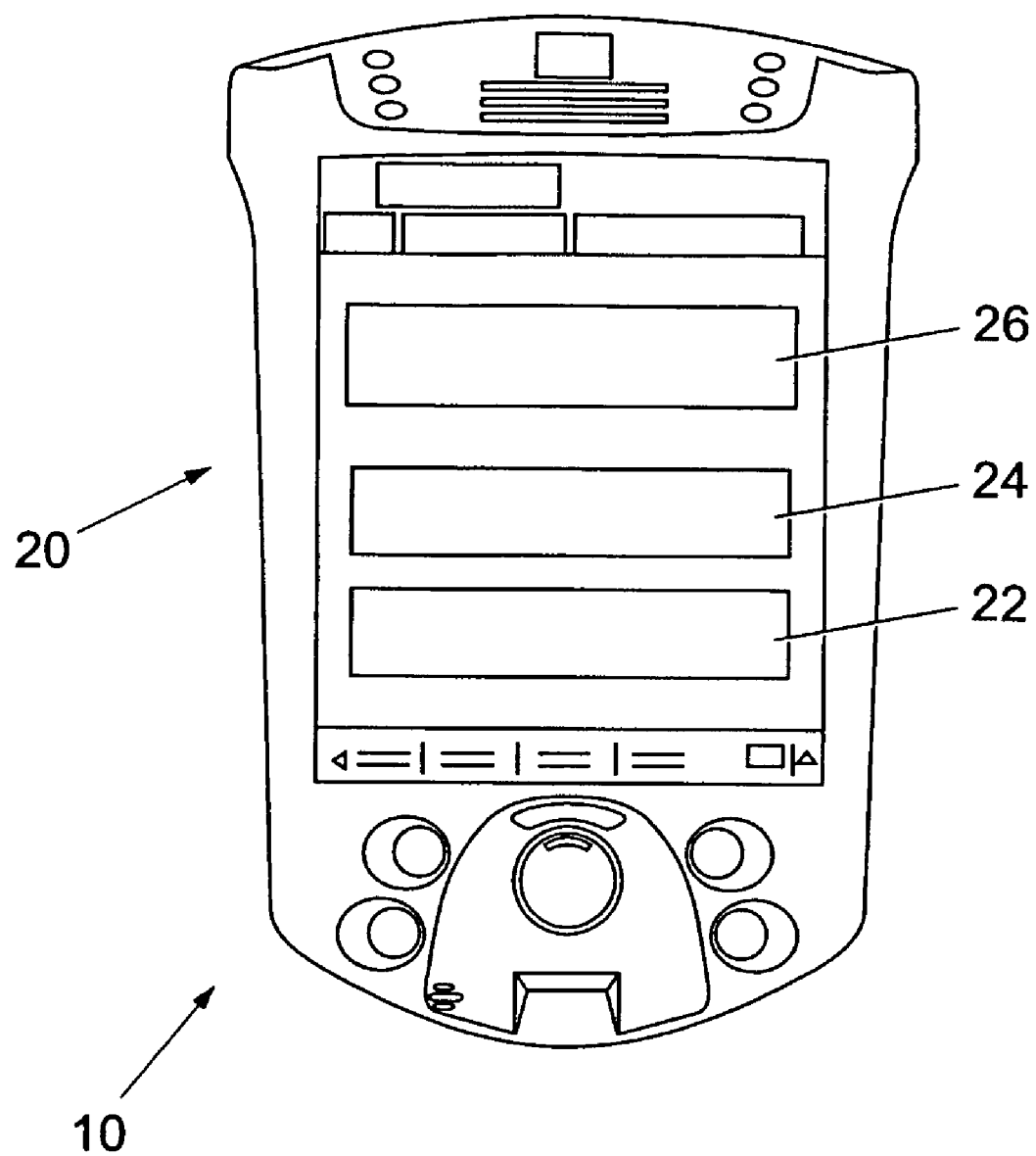
FIG. 5 is a plan view of a vibration analyzing device according to the present invention.

FIG. 5 shows a vibration analyzing device 10 for determining the vibration response of a structural element, such as a pipe (not shown). The device 10 includes a vibration sensor, such as an accelerometer (not shown), for providing an output in response to a force input imparted to the pipe. The device 10 has particular advantages when used in situ for existing pipe-work. In such cases, the force input is the actual loading conditions of the pipe caused by one or more sources of excitation including the flow, pulsation and transmission.

The device 10 also includes processing means (not shown) adapted to determine a classification in response to the output. This classification corresponds to a condition of the pipe. Each classification corresponds to a different probability of failure of the structural element since each probability of failure corresponds to a different predetermined vibration criterion, as shown in FIG. 3.

Display means 20 is provided. This includes a display 22 for the determined classification, as well as a display 24 for the determined peak frequency and a display 26 for the determined single RMS velocity value. The classification display 22 may change color depending on the classification displayed for easier identification.

Figure 6:
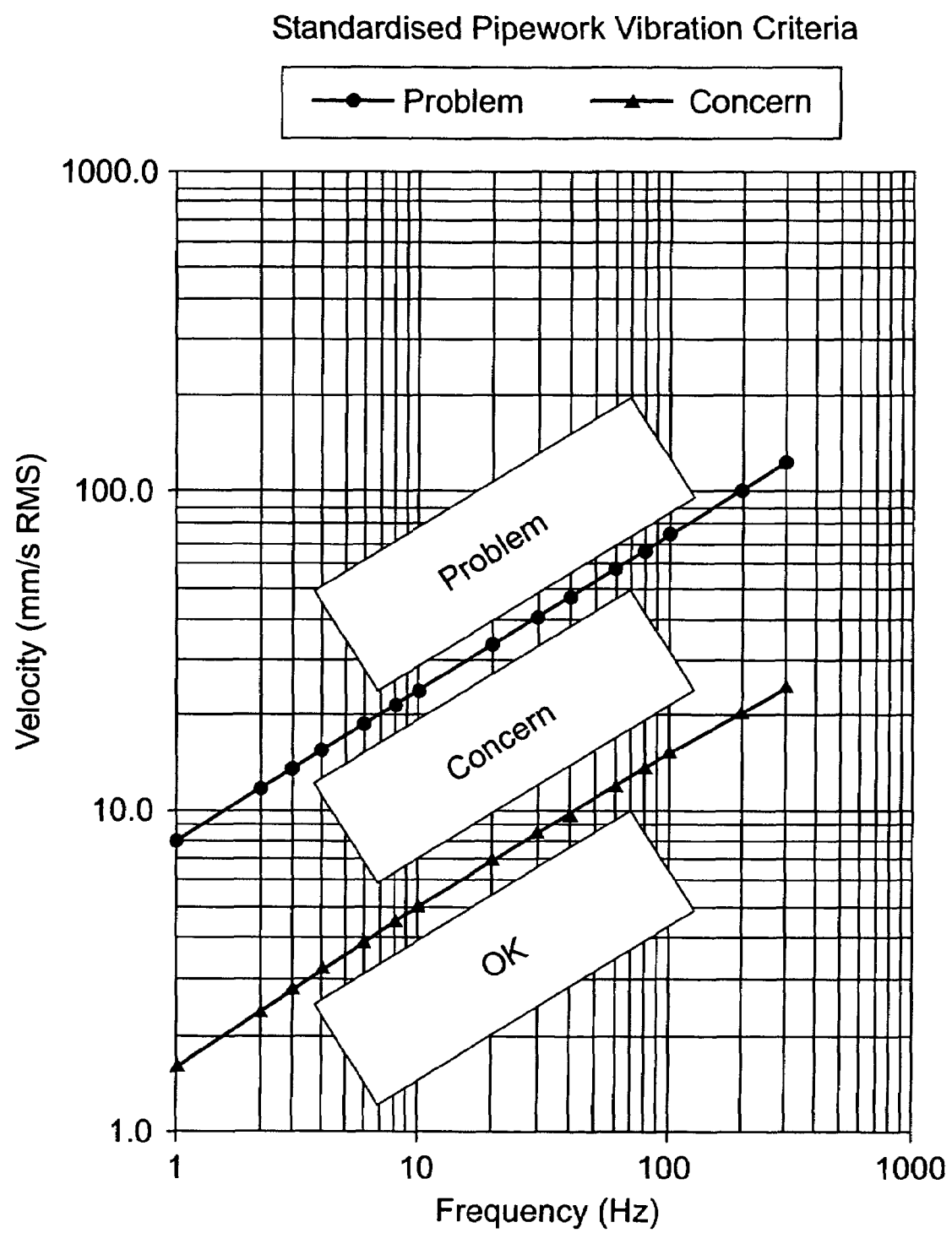
FIG. 6 is a graph of predetermined vibration criteria using velocity with respect to frequency and showing determined classifications.

If it is determined using the vibration criterion that no action is required since vibration levels are acceptable then a classification of "OK" is displayed. If it is determined that the level of vibration is above this safe level and further analysis is required to determine if modifications must be undertaken to prevent possible high cycle fatigue failure then a classification of "Concern" is displayed. If it is determined that the level of vibration is above this intermediate level and modifications must be undertaken to prevent high cycle fatigue failures then a classification of "Problem" is displayed. This is shown in FIG. 6.

The output from the accelerometer is acceleration data. The accelerometer may be a tri-axial sensor for providing an output for each of three orthogonal axes. The processing means can readily be adapted to process the output for each of the three orthogonal axes since there is no interaction of the axes and so this can be done separately.

The device includes a Fast Fourier Transform (FFT) analyzer (not shown) which provides frequency response data corresponding to the output of the vibration sensor.

The device 10 includes a low pass filter and a high pass filter to filter out frequencies between 2 and 2000 Hz.

The processing means is provided by a computer in the form of a pocket PC, which also provides the display means. The pocket PC comprises the Recon™ IP67 Rugged PDA, manufactured by TDS™. It includes an extended end cap with IP67 accelerometer connector. The operating system is Microsoft Windows Pocket PC 2003. A minimum processor speed of 400 MHz is required.

An interface card is also provided for connecting the accelerometer and the computer. This can be the Dataq-CF2 interface card from C-Cubed Limited™.

Software, developed by the Applicant, is provided for programming the computer to determine the vibration response of the structure and incorporates the pipe-work vibration criteria.

The lowest peak frequency is determined from the frequency response data from the FFT analyzer. This lowest peak frequency is the frequency at which the maximum ratio of measured amplitude and marginal classification amplitude occurs.

The application of the curves involves calculating the overall RMS of the velocity spectrum and the peak frequency and then assuming that all energy is acting at the dominant frequency. The amplitude is then compared to the vibration curves at the peak frequency and a classification calculated.

The formulae used for "OK", "Concern" and "Problem" levels for velocity RMS levels are detailed below.

$$OK < 10 \wedge \left[ \frac{LOG(Freq) + 0.4801698}{2.1276121} \right]$$

$$Concern \geq 'OK' \text{ and} < 'Problem'$$

$$Problem \geq 10 \wedge \left[ \frac{LOG(Freq) + 1.8710827}{2.0845473} \right]$$

$$PeakFreq(Hz) = \max\left[ \frac{\text{"measured" amplitude}}{\text{"OK" amplitude}} \right] \text{ where}$$

$$OK = 10 \wedge \left[ \frac{LOG(Freq) + 0.4801698}{2.1276121} \right]$$

The following results may be displayed on the pocket PC on completion of a measurement: line number; measurement reference and direction; velocity mm/sec RMS; peak frequency; classification; and frequency plot. However, it is possible to 'hide' the frequency plot from the user.

The data recorded for each test may have a date and time stamp to allow subsequent measurements of the same location to be saved. The following data may be saved for each measurement: frequency domain data; peak frequency; velocity RMS mm/sec; classification; process conditions; and pipe-work information.

In order to maintain confidentiality of data between the end user of the analyzer and a third party, the data file may be saved as a secure format.

The device may includes transmitting means, such as email, for transmitting the data file to the third party. If the level of vibration is above a 'Concern' classification then the data file containing the frequency domain data is sent to the third party via email for further analysis.

The transmission to the third party may be a semi-automatic process, by which, if the classification is "CONCERN" or above, a dialogue box opens automatically and requests the user to send an email with the data attached. It is also possible for the user to send data manually, such as by opening the same dialogue box and specifying the pipe-work ID. Additional software is provided to allow the third party to read the data.

The invention therefore offers a vibration analyzer which is simple to operate and has an easily read display. It is hand held and compact. The device 10 gives an immediate classification of vibration based on pipe-work vibration criteria.

The analyzer may therefore be used by non-expert personnel with minimal training.

Various modifications and improvements can be made without departing from the scope of the present invention. For instance, the structural element may not be a pipe. It may even comprise a part of the body, such as the hand or arm, of a human operator.

What is claimed is:

1. A method of determining the vibrational response of a structural element, comprising the steps of:
   sensing an output of the structural element in response to a force input imparted to the structural element;
   determining frequency response data for the structural element from the sensed output of the structural element;
   determining a peak frequency for the structural element;
   integrating one of the acceleration data and the frequency response data determined from the acceleration data to determine velocity data for the structural element;
   determining a single Root Mean Square (RMS) amplitude value from the velocity data;

determining one of a plurality of classifications in response to the output, each classification corresponding to a condition of the structural element; and displaying the determined classification.

2. A method as claimed in claim 1, wherein each of the plurality of classifications corresponds to a different probability of failure of the structural element.

3. A method as claimed in claim 2, wherein the plurality of different probabilities of failure correspond to different predetermined vibration criteria.

4. A method as claimed in claim 1, including using colour coding for each of the classifications.

5. A method as claimed in claim 1, including using the actual loading conditions of the structural element as the force input.

6. A method as claimed in claim 1, including associating the single RMS amplitude value with the peak frequency.

7. A method as claimed in claim 6, including providing at least one predetermined vibration criterion, wherein the or each criterion comprises a plurality of amplitude values, each value having an associated frequency value.

8. A method as claimed in claim 7, including comparing the single RMS amplitude value with the amplitude value of the vibration criterion which is associated with the peak frequency to determine the classification.

9. A method as claimed in claim 8, including transmitting vibration data to a third party.

10. A method of determining the vibrational response of a structural element, comprising the steps of:

sensing an output of the structural element in response to a force input imparted to the structural element;

calculating frequency response data for the structural element from the sensed output of the structural element;

determining a single amplitude value from the frequency response data;

determining a peak frequency from the frequency response data;

associating the single amplitude value with the peak frequency;

providing at least one predetermined vibration criterion, the or each criterion comprising a plurality of amplitude values, each amplitude value having an associated frequency value; and comparing the single amplitude value with the amplitude value of the or each criterion associated with the peak frequency.

11. A method as claimed in claim 10, wherein the step of sensing an output of the structural element comprises sensing an acceleration of the structural element to provide acceleration data.

12. A method as claimed in claim 11, including integrating one of the acceleration data and the frequency response data determined from the acceleration data to determine velocity data for the structural element.

13. A method as claimed in claim 12, wherein the single amplitude value is a Root Mean Square (RMS) value of the velocity data.

14. A method as claimed in claim 10, including determining one of a plurality of classifications in response to the comparison, each classification corresponding to a condition of the structural element.

15. A method as claimed in claim 14, including presenting the classification to the user.

16. A method as claimed in claim 15, including transmitting vibration data to a third party.

* * * * *